3,012,934
METHOD OF REPELLING INSECTS EMPLOYING 2-BENZYL-p-CRESOL
Kenneth E. Cantrel, Dewey, and Raymond L. Cobb, Bartlesville, Okla., assignors to Phillips Petroleum Company, a corporation of Delaware
No Drawing. Filed Oct. 22, 1958, Ser. No. 768,837
3 Claims. (Cl. 167—31)

This invention relates to an insect repellent and to a method for using same. In one of its aspects, the invention relates to the application of 2-benzyl-p-cresol as a fly repellent. In another of its aspects, the invention relates to repelling house flies employing 2-benzyl-p-cresol as a repellent. In a further aspect, the invention relates to the repelling of stable flies employing 2-benzyl-p-cresol as a stable fly repellent.

The use of various agents to combat insects has become wide spread in recent years. Although the majority of insect combatting agents are insecticides, that is, they kill the insect, increasing attention is also being paid to insect repellents. Insect repellents are advantageous in that they prevent the fly from frequenting the place where the presence or sight of such insects would be undesirable or unpleasant.

It has now been found, surprisingly, that 2-benzyl-p-cresol is repellent to both house and stable flies notwithstanding the fact that many other cresol derivatives have been found unacceptable for this purpose.

It is an object of this invention to provide an insect repellent. It is another object of this invention to provide a method of repelling insects such as house and stable flies. It is a further object of this invention to provide an insect combatting composition containing a compound having outstanding insect repellent activity.

Other aspects and objects of this invention are apparent from a study of this disclosure and the appended claims.

According to the present invention, there are provided a novel insect repellent composition comprising 2-benzyl-p-cresol and a method of repelling insects which comprises subjecting said insect to the action of 2-benzyl-p-cresol.

The repellent of the invention can be applied to surfaces and/or can be dispersed into spaces from which it is desired to repel flies. When applied to surfaces to repel flies, the repellent usually will be applied in the form of a thin film, usually by spraying or painting a composition comprising the repellent of the invention upon said surface. A thin film of such a composition ordinarily suffices to obtain good repellency. Suitably diluted, as will be understood by one skilled in the art, the repellent of the invention can be compounded with oils or creams and applied to animals to aid in repelling flies from the animals.

In general, an amount within the range between 0.001 and 5 grams of the repellent are deposited on each square foot of surface from which the flies are to be repelled. Preferably, from 0.1 to 3 grams per square foot are deposited. The repellent can be applied as the pure compound or it can be applied as solutions, emulsions, dusts, wettable powders, and the like. Suitable solvents include naphthas, kerosenes, aromatic hydrocarbons, ketones, and isoparaffinic hydrocarbons boiling within the range between 250° F. and 800° F. and sold under the trade name of Soltrol. When emulsions are used, it is preferred that non-ionic emulsifiers such as alkyl aryl alcohols be employed. The repellent of this invention can also be applied to surfaces dispersed in a wax. When applied in conjunction with a carrier, the repellent will be present in the solution, emulsion, etc. in the range of about 0.3 to 30 percent by weight of the carrier material, preferably between 0.5 and 15 percent by weight. Such a solution can be aerosol dispersed using a propellent, as known in the art.

The repellent of this invention can also be admixed with pyrethrum synergists such as N-(2-ethylhexyl)bicyclo-[2.2.1],5-heptene-2,3-dicarboximide, piperonyl butoxide, isosafrole sulfoxide and the like. This new insect repellent can also be used admixed with other known insect repellents.

The following specific examples illustrate the effectiveness of 2-benzyl-p-cresol as a repellent for flies, particularly house flies, but it is not intended that the invention be limited to the specific concentrations and test procedures shown in these examples. Clearly, it is evident from general knowledge and the examples that other modes of use and concentrations can be employed.

EXAMPLE I

A number of runs was carried out in which various substituted cresols and phenols were tested as repellents for house flies.

Repellency to house flies was determined by the sandwich bait method which is essentially that disclosed by L. D. Kilgore in "Soap," June 1949.

*Sandwich bait test.*—This test involves placement of a porous barrier treated with the candidate composition between the starved insects (house flies) and food. If the chemical is repellent, the flies will not eat. If the chemical is not repellent, the insects will eat the food through the barrier. The bait is prepared as follows: a smooth thin film of unsulfured molasses is spread on a 1" x 4" strip of cardboard leaving a margin of at least ¼ inch on all sides. The purpose of the margin is to prevent the feeding of the insects unless they are actually on the strip, thus facilitating counting. These prepared strips are dried in the oven at 45° C.

Porous cover strips of lens paper are impregnated with the chemical under examination and superimposed on the bait. The paper is thin, porous, and highly absorbent. The loose fiber construction of this paper permits the fly to remove the molasses through it. In order to impregnate these strips uniformly they are immersed in an acetone solution of the material to be tested. They are then hung over a glass rod and dried for 6 hours.

Just before the test is begun the dried cover strips are carefully placed over the baits and fastened in place by stapling. In assembling the bait, care must be taken not to press down on the bait or touch it with the fingers as the molasses is easily forced up through the cover strip. Two sandwich baits are attached to a cardboard backing. The whole assembly then is clipped onto one of the jar lids that fit the opening in the rubber back of the insect cages.

The lid with the baits is fitted into the aperture in the cage so that the baits are exposed to attack. The flies, in this instance, house flies (*Musca domestica*), are over five days old and have been starved for 6 hours. Counts of the number of flies feeding on the strips are taken after 5 and 15 minutes and every 15 minutes thereafter for 165 minutes. The non-repellents become black with flies soon after being placed in the cages. The good repellents are untouched. The difference is very striking. At the end of 165 minutes, the flies are left in the cages overnight, and the amount of molasses remaining on the candidate cards is estimated. The results of these tests are expressed below as Table I.

In the following table, the first seven cresol and phenol compounds under identical conditions of tests prove to be unacceptable for repelling the house flies.

Table I

| Compound | Conc. of Solution, Weight Percent | Number of Flies Feeding at Indicated Time, Minutes | | | | | | | | | Percent Molasses Remaining After Starving Flies in Cage Overnight |
|---|---|---|---|---|---|---|---|---|---|---|---|
| | | 5 | 15 | 30 | 45 | 60 | 90 | 120 | 150 | 165 | |
| 2,6-di-(sec-butyl)-p-cresol | 1 | 0 | 3 | 8 | 18 | 16 | (*) | ---- | ---- | ---- | ---- |
| 2,6-di(sec-octyl)-p-cresol | 1 | 0 | 0 | 26 | 35 | 30 | (*) | ---- | ---- | ---- | ---- |
| 2,4,6-tribenzylphenol | 1 | 6 | 50+ | 29 | (*) | ---- | ---- | ---- | ---- | ---- | ---- |
| 2,6-di(2-octyl)-p-cresol | 1 | 2 | 46 | 32 | 24 | (*) | ---- | ---- | ---- | ---- | ---- |
| 2,4-dicyclohexylphenol | 1 | 0 | 0 | 31 | 36 | 22 | 8 | (*) | ---- | ---- | ---- |
| 2-sec-butyl-p-cresol | 1 | 25 | 35 | 50+ | 10 | (*) | ---- | ---- | ---- | ---- | ---- |
| 2,6-dicyclohexyl-p-cresol | 1 | 0 | 1 | 50+ | 24 | (*) | ---- | ---- | ---- | ---- | ---- |
| 2-benzyl-p-cresol | 1 | 0 | 0 | 0 | 0 | 0 | 0 | 0 | 0 | 0 | 100 |
| 2-benzyl-p-cresol | 0.5 | 0 | 0 | 0 | 0 | 0 | 0 | 0 | 0 | 0 | 100 |
| 2-benzyl-p-cresol | 0.25 | 0 | 0 | 0 | 0 | 0 | 0 | 0 | 0 | 0 | 93 |

* Indicates molasses completely consumed or gone.

It can be seen by the above runs that 2-benzyl-p-cresol is extremely effective in repelling house flies as compared with other substituted cresols which are ineffective and, therefore, unacceptable in the same test.

EXAMPLE II

Several other runs were carried out in which 2-benzyl-p-cresol was tested as a repellent for house flies.

In these tests, a number of 20-ply cotton cord strings were soaked in a one percent by weight solution of 2-benzyl-p-cresol in xylene. Ten of the strings were then strung on a grid, and a 10-string grid containing no repellent was also made up. These grids were then exposed to flies in a hog house, and the percentage repellency to house flies was determined by estimating the number of flies on the treated strings as compared to the flies on the untreated strings. a grid of strings which had been treated with the repellent was also exposed to sunlight before being exposed to house flies. All exposures to house flies were conducted inside the hog houses. The results of these tests are expressed as Table II.

Table II

| Repellency without Exposure to Sunlight | Repellency after Exposure to Sunlight |
|---|---|
| 1st day—100%. | 1 day exposure—100%. |
| 5th day—74%. | 5 days exposure—72.5%. |
| 10th day—78%. | 10 days exposure—72.5%. |

It is evident from the above runs that 2-benzyl-p-cresol retains its repellency even after being exposed to strong ultraviolet radiation. Thus, the repellents of this invention are useful for repelling flies from outdoor locations.

EXAMPLE III

The repellent of this invention, 2-benzyl-p-cresol, was tested as a repellent for stable flies (*Stomoxys calcitrans*). In this test, a population of about 5,000 or more stable flies was contained in 30 cubic inch cages so that vigorous biting activity can be maintained through the test period. The stables flies were not fed in the morning, and the tests were started at about 11 a.m. The tests were made with colonies not over one week old.

Organdy bags having 100 square inches of cloth were impregnated by absorbing 6–7 milliliters of an acetone solution containing one gram of 2-benzyl-p-cresol. The bag was then air dried for about 24 hours, after which the impregnated bag was drawn over the hand and exposed to the stable flies. The time to the first bite was recorded, and if no bites were received in 5 minutes, the bag was hung up and the test repeated the next day. If a bite was received the time to the second and third bites was also recorded.

The results of one test are recorded below as Table III.

Table III

| Compound | Seconds to First Bite | | |
|---|---|---|---|
| | 1st Day | 2nd Day | 3rd Day |
| 2-benzyl-p-cresol | NB* | 120, NB | 60, 30, 120 |

*No bites received.

In the absence of a repellent, the bites were numerous and frequent, for example on the order of one bite a second and even more. It can be seen from the above table that 2-benzyl-p-cresol is an effective repellent for stable flies.

EXAMPLE IV

In addition to the stable fly data available in Example III, several of the compounds which were used as control runs in Example I were tested and found to be ineffective as stable fly repellents. These data are given below in the form of a table. None of these compounds were repellent to stable flies, as bites were received consistently on the first day for each of the compounds. In the table, the figures shown are the seconds to the first, second and third bites.

Table IV

| Compound | Seconds to First, Second and Third Bites on First Day |
|---|---|
| 2,4-dicyclohexylphenol | 15, 5, 3 |
| 2,6-di(sec-butyl)-p-cresol | 27, 5, 10 |
| 2,6-di(sec-octyl)-p-cresol | 17, 7, 9 |
| 2,4,6-tricyclohexylphenol | 12, 7, 17 |
| 2,4,6-tribenzylphenol | 8, 4, 4 |
| 2-(sec-butyl)-p-cresol | 20, 5, 4 |
| 2,6-di(cyclohexyl)-p-cresol | 7, 8, 5 |

Reasonable variation and modification are possible within the scope of the foregoing disclosure and the appended claims to the invention, the essence of which is that 2-benzyl-p-cresol has been found preeminently satisfactory as an insect repellent, especially for repelling house flies and stable flies.

We claim:
1. A method of repelling an insect which comprises subjecting said insect to the action of 2-benzyl-p-cresol.
2. A method of repelling an insect from a space which comprises spraying into said space 2-benzyl-p-cresol.
3. A method of repelling flies from a surface which comprises depositing 2-benzy-p-cresol in an amount in the range 0.001–5 grams of said 2-benzyl-p-cresol on each square foot of surface.

References Cited in the file of this patent
UNITED STATES PATENTS 1,880,566   Weiler et al. _____ Oct. 4, 1932

OTHER REFERENCES

Farinholt et al.: J.A.C.S., vol. 55, pp. 3383–87 (1933).
King: Chemicals Evaluated as Insecticides, U.S. Dept. Agr., Handbook No. 69, pages 6–7 and 132, May 1954.